United States Patent [19]
Hec et al.

[11] Patent Number: 6,129,105
[45] Date of Patent: Oct. 10, 2000

[54] INTERRUPTER HAVING AN ANTI-FIRE VALVE MEMBER FOR A GAS METER, AND A GAS METER FITTED WITH SUCH AN INTERRUPTER

[75] Inventors: Michel Hec, Carrières sur Seine; Jean-Luc Champougny, Epernay, both of France

[73] Assignee: Schlumberger Industries, S.A., Montrouge, France

[21] Appl. No.: 08/998,539

[22] Filed: Dec. 26, 1997

[51] Int. Cl.[7] .............................. F16K 17/40; F16K 25/00
[52] U.S. Cl. .................................. 137/75; 137/79; 251/86; 251/129.11
[58] Field of Search ................................ 137/72, 75, 79; 251/129.11, 86, 358, 356

[56] References Cited

U.S. PATENT DOCUMENTS

| | | | |
|---|---|---|---|
| 1,166,027 | 12/1915 | Weisgerber et al. | 251/86 X |
| 1,800,683 | 4/1931 | Gaunt et al. | 251/86 X |
| 1,950,120 | 3/1934 | Mc Kee | 251/86 X |
| 2,308,861 | 1/1943 | Clifford | 251/86 |
| 2,398,089 | 4/1946 | Fehr | 251/86 X |
| 2,456,403 | 12/1948 | Goehring | 251/86 |
| 2,479,688 | 8/1949 | Lindgren | 251/86 |
| 3,671,009 | 6/1972 | Stampfli | 251/86 X |
| 4,237,924 | 12/1980 | Benjamin et al. | 251/86 X |
| 5,135,025 | 8/1992 | Mackal | 251/86 |
| 5,464,039 | 11/1995 | Bergamini | 251/129.11 X |
| 5,709,369 | 1/1998 | Hawkins et al. | 251/86 |

*Primary Examiner*—John Rivell
*Attorney, Agent, or Firm*—Leonard W. Pojunas

[57] ABSTRACT

A gas flow interrupter for a gas meter, the interrupter comprising a valve member that is movable relative to a valve seat which defines an opening for passing said gas flow, said valve member comprising firstly a membrane having a main surface including a "contact zone" portion that comes into contact with said valve seat when the interrupter is in its closed position, thereby closing said opening by means of the main surface of the valve member, and secondly a part that forms a mechanical support for the membrane and that co-operates with said membrane, wherein the metal part forming a support for the membrane has a continuous leakproof surface bounded by the contact zone so as to close the opening in the event of the membrane failing to provide sealing.

17 Claims, 5 Drawing Sheets

INTERRUPTER HAVING AN ANTI-FIRE VALVE MEMBER FOR A GAS METER, AND A GAS METER FITTED WITH SUCH AN INTERRUPTER

The present invention relates to a gas flow interrupter for a gas meter, the interrupter comprising a valve member that is movable relative to a valve seat which defines an opening for passing said gas flow, said valve member comprising firstly a membrane having a main surface including a "contact zone" portion that comes into contact with said valve seat when the interrupter is in its closed position, thereby closing said opening by means of the main surface of the valve member, and secondly a part that forms a mechanical support for the membrane and that co-operates with said membrane.

BACKGROUND OF THE INVENTION

In gas meters, and in particular so-called "domestic" gas meters, it is known to install a gas flow interrupter upstream from the measurement chamber of said meter for safety purposes. For example, in the event of a gas leak, gas meters detect a leakage flow rate, thereby automatically causing the interrupter to interrupt the gas flow.

Such an interrupter is also used when the gas meter is fitted with a prepayment system, in which case it serves to interrupt the flow of gas when the user's credit is exhausted.

For example, a known gas meter interrupter comprises a valve member that is movable relative to a valve seat and in which the valve member is constituted by a resilient membrane that is hemispherical in shape and is hinged about a pivot that forms a ball joint connection. When a fire breaks out, provision is made for the interrupter to be activated to take up its closed position and interrupt the flow of gas.

Unfortunately, with an interrupter as described above, the resilient membrane melts at high temperature and as a result the valve member can no longer perform the sealing function required of the interrupter in the closed position, which constitutes a major drawback.

Another type of interrupter is known in which the valve member is mainly formed by a central part hinged about a pivot, a substantially plane spring fixed around said central part, and a resilient membrane covering the central part and the spring, and overlying the peripheral portion of said spring.

At high temperature, the interrupter actuated into its closed position closes the valve seat and the membrane melts so that the central part and the spring of the valve member become exposed to the flow of gas and can no longer perform the sealing function.

Sometimes, the membrane of a valve member in an interrupter is not always gastight for various reasons, e.g. associated with the material of the membrane or with the method by which it is made. For these reasons, it can be advantageous to design a valve member that is capable of diminishing leakage associated with the membrane, regardless of temperature.

OBJECTS AND SUMMARY OF THE INVENTION

The invention thus seeks to remedy at least one of the above-described problems by proposing a gas flow interrupter for a gas meter which is simple in design and which is capable of providing sealing relative to the flow of gas.

The present invention thus provides a gas flow interrupter for a gas meter, the interrupter comprising a valve member that is movable relative to a valve seat which defines an opening for passing said gas flow, said valve member comprising firstly a membrane having a main surface including a "contact zone" portion that comes into contact with said valve seat when the interrupter is in its closed position, thereby closing said opening by means of the main surface of the valve member, and secondly a part that forms a mechanical support for the membrane and that co-operates with said membrane, wherein the metal part forming a support for the membrane has a continuous leakproof surface bounded by the contact zone so as to close the opening in the event of the membrane failing to provide sealing.

At high temperatures, when the membrane begins to melt, the continuous leakproof surface of the metal part forming a support for the membrane comes into position against the valve seat in register with the membrane contact zone via a portion of its continuous surface facing the opening of the valve seat, said part thus closes the opening of said valve seat and therefore provides gastight sealing. It should also be observed that this design of valve member is also advantageous at any temperature in the event that the membrane is not completely leakproof.

The part forming a support for the membrane rests in equilibrium on a pivot and is thus placed between the membrane and said pivot. The fact of having such a part that is merely placed on a pivot and that hinges about said pivot makes it possible in simple manner to ensure that said part provides gastight sealing. It is not possible to obtain such sealing with prior art membrane support parts which are always secured to their pivots and constituted by a plurality of elements that are assembled together. Because they are made up from a plurality of elements such parts give rise to problems of leakage where the elements make contact with one another. In addition, such parts are complicated to make and to assemble.

The part forming a support for the membrane is preferably centered on the pivot. For example the pivot may possess an endpiece having a spherical bearing surface. To ensure good equilibrium, the part forming a support for the membrane has a cavity facing the pivot and in which said pivot is received.

To improve co-operation between the membrane and the part forming a support for the membrane, a portion of the membrane in register with the cavity bears against the part forming a support for the membrane. This also makes it possible to hold the part forming a support for the membrane against its pivot.

In order to provide better gastight sealing when the interrupter is in its closed position and the membrane begins to melt, the part forming a support for the membrane possesses a frustoconical bearing surface situated facing the contact zone and which therefore comes into leakproof contact with the valve seat.

By way of example, the part forming a support for the membrane may be in the form of a disk.

The frustoconical bearing surface of the disk is disposed between a central portion and a peripheral portion which are both substantially plane.

The part forming a support for the membrane is in contact with the membrane via one of its faces, and via its opposite face it is in contact with a holding ring engaged around an element extending the pivot, said membrane forming a cap which covers the part forming a support for the membrane and which encompasses the stack constituted by said part and by said ring, covering a peripheral portion of the face of the ring which is not in contact with said part.

More precisely, the valve member is connected to a valve shaft extending along a longitudinal direction and mounted to move in said direction under drive from a motor driving said valve shaft by means of a mechanical drive device which leaves the valve shaft with a degree of freedom to move in translation along said direction.

According to an additional characteristic, a compressed resilient member co-operates with a "fuse" element made of a material that melts under the action of heat so that below the melting temperature of said material the resilient member is held in a compressed state, and at around the melting temperature of the material, the resilient member is released and forces the valve member to come into contact with the valve seat. Thus, by combining this quick closing characteristic of the interrupter with the leakproof continuous surface of the part forming a support for the valve membrane, an anti-fire interrupter is obtained that is simple and particularly effective. A part tied to the valve shaft is subjected to the force of the resilient member urging the valve member towards the valve seat, and is held in position by means of the fuse element.

In one embodiment, the valve shaft is threaded and the part tied to the valve shaft forms a nut in which said valve shaft is engaged, said nut-forming part is received in an orifice formed through a base and it includes a shoulder, the resilient member being compressed between said base and said shoulder so as to exert a force on said part that urges it towards the valve seat. The nut-forming part passes through the orifice and projects beyond the base away from the side where the resilient member is located, the fuse element being held pressing against said base and exerting a force on said part holding it away from the valve seat.

In another embodiment, the fuse element is placed between the valve member and the resilient member which bears against a support, said fuse element being in direct contact with said resilient member to hold it compressed against its support. The valve shaft slides in a bearing mounted on the support, and the fuse element forms a collar disposed around said bearing, the resilient member being compressed between said collar and said support.

The present invention also provides a gas meter fitted with a gas flow interrupter, comprising a valve member that is movable relative to a valve seat which defines an opening for passing said gas flow, said valve member comprising firstly a membrane having a main surface including a "contact zone" portion that comes into contact with said valve seat when the interrupter is in its closed position, thereby closing said opening by means of the main surface of the valve member, and secondly a part that forms a mechanical support for the membrane and that co-operates with said membrane, wherein the metal part forming a support for the membrane has a continuous leakproof surface defined by the contact zone so as to close the opening in the event of the membrane failing to provide sealing.

The interrupter may include the characteristics mentioned above.

BRIEF DESCRIPTION OF THE DRAWINGS

Other characteristics and advantages appear from the following description given by way of non-limiting example and made with reference to the accompanying drawings, in which.

MORE DETAILED DESCRIPTION

Figure 1:
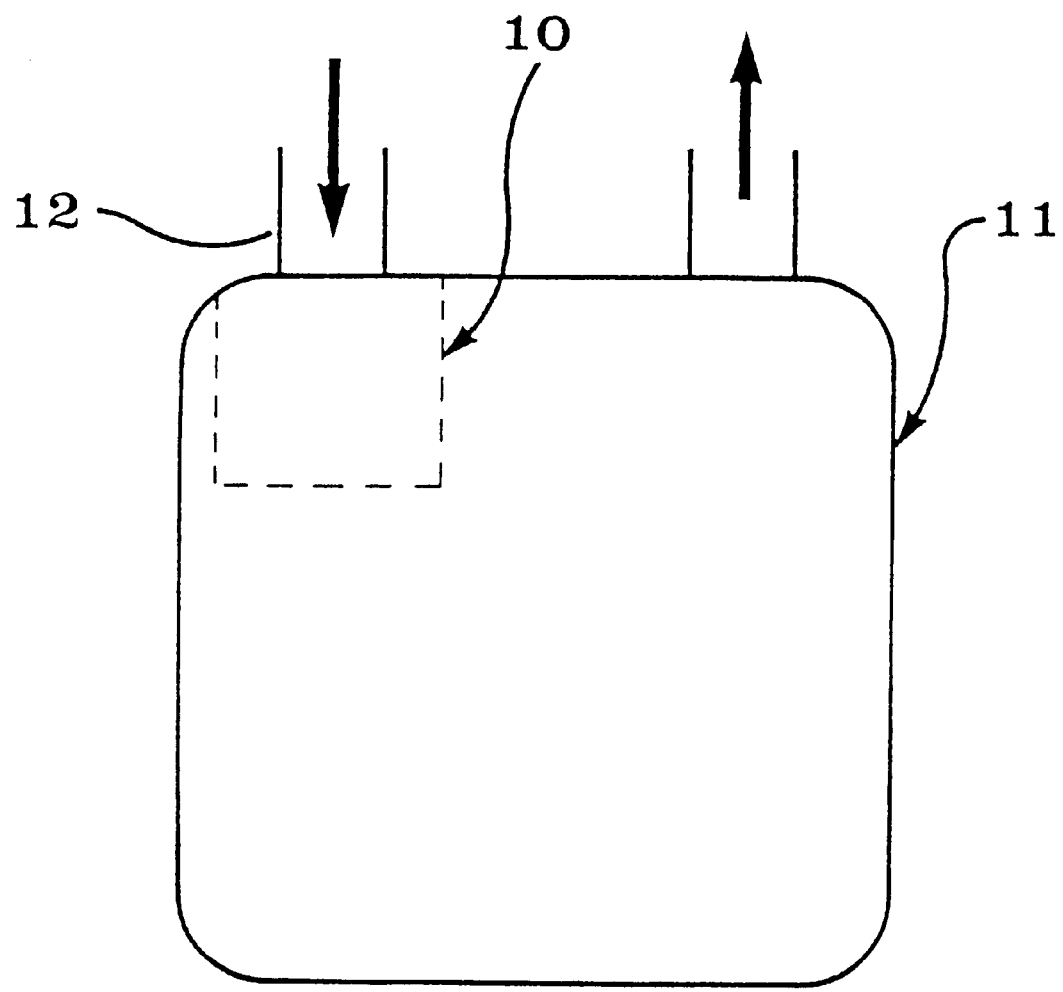
FIG. 1 is a simplified view of a gas meter fitted with an interrupter of the invention.
Figure 1A:
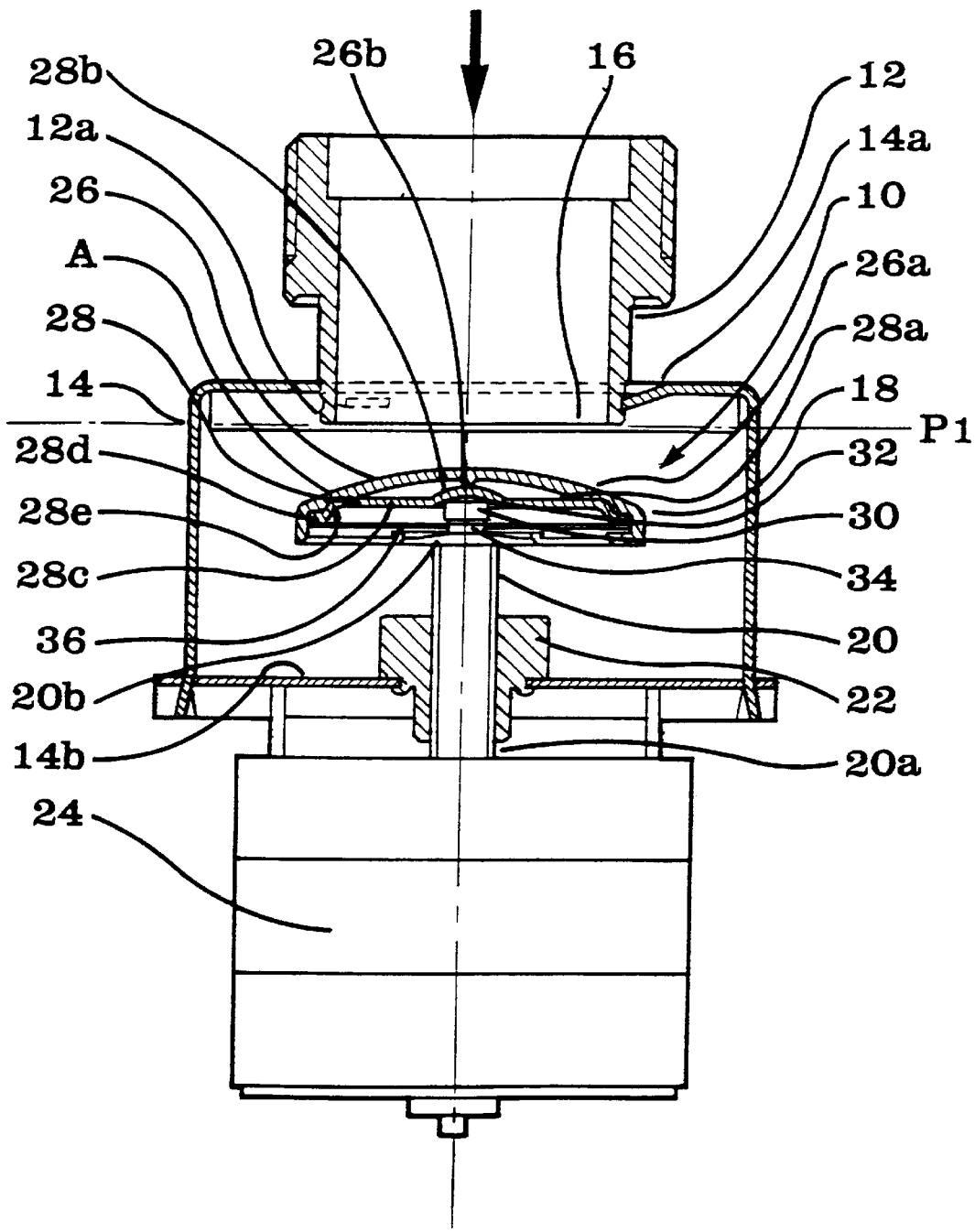
FIG. 1a is a diagrammatic section view through one embodiment of the interrupter of the invention.

As shown in FIG. 1 and given overall reference 10, an interrupter in one embodiment of the invention is located inside a gas meter 11 having a gas feed coupling 12. The interrupter is disposed inside a metal frame 14 whose top portion 14a is secured to the gas feed coupling 12 (FIG. 1a). The bottom end of the coupling 12 in contact with the top portion 14a of the frame 14 forms a valve seat 12a which defines an opening 16 of circular section through which the gas flow passes.

Gas feed takes place in the direction indicated by the arrow in FIGS. 1 and 1a. When a flow of gas runs from the gas feed coupling 12 into the frame 14, said gas flow can escape from said frame via openings (not shown in the figure) disposed in a plane parallel to the plane of the figure.

The valve member 18 of the interrupter 10 is mounted on a "valve" shaft 20 extending perpendicularly to the plane P1 containing the opening 16 defined by the valve seat. The valve shaft 20 has a threaded portion which is mounted in a nut-forming part 22 that is in turn fixed, e.g. by crimping, in the bottom portion 14b of the frame 14, referred to as its base. A motor 24 which may advantageously be of the stepper type is placed at the end 20a of the valve shaft 20 that is furthest from the valve member 18. The motor 24 thus rotates the valve shaft 20 which by helical motion enables the valve member 18 to be raised and lowered, and thus enables the interrupter to be closed and opened.

The valve member 18 has a membrane 26 bearing against a metal part 28 forming a support for the membrane. The membrane 26 has a main surface 26a that is convex, projecting towards the opening 16, and that includes a "contact zone" portion A that comes into contact with the valve seat 12a when the interrupter is in its closed position. In this position, the major portion of the main surface 26a of the membrane 26 is situated facing the opening 16, and therefore closes it.

As shown in FIG. 1a, the part 28 forming a support for the membrane has a continuous leakproof surface 28a disposed facing the concave portion of the membrane 26. The part 28 forming a support for the membrane extends in a direction that is contained in a plane parallel to the plane P1 and it extends over a size that is not less than the outside diameter of the valve seat 12a so that the continuous surface 28a is situated in register with the valve seat and the opening 16. The part 28 forming a support for the membrane and which is generally in the form of a disk, for example, rests in equilibrium on a pivot 30 secured to the valve shaft 20 and it is centered on said pivot. As can be seen in FIG. 1a, the pivot 30 has an endpiece 32 with a spherical bearing surface which enables good contact to be obtained with the part 28 and which provides a ball joint type connection therewith. Such a connection serves to compensate for errors of perpendicularity between the valve shaft 20 and the valve seat 12a, and therefore contributes to providing better sealing. In its center, facing the pivot 30, the part 28 forming a support for the membrane has a cavity 28b formed by stamping, for example, with its concave side facing towards said pivot. The spherical endpiece 32 is thus received in the concave portion 28b of the part 28.

The part 28 forming a support for the membrane has a central portion 28c and a peripheral portion 28d, both of which are substantially plane and they are united via a intermediate portion 28e placed in register with the contact zone A. The intermediate portion 28e is frustoconical in shape (with the apex of the cone being situated towards the top of the figure), thereby enabling it to fit against the valve seat 12a, thereby improving sealing compared with a part forming a support for the membrane having a continuous surface that is substantially plane in shape.

The valve shaft 20 has a neck 34 near its end 20b, beneath the pivot 30. A holding ring 36 is engaged on the neck 34 leaving mechanical clearance between said ring and the neck so as to allow the ball joint type connection to perform its function. The diameter of the neck 34 is smaller than the diameter of said pivot so as to prevent any axial displacement of the holding ring.

The part 28 forming a support for the membrane is in contact via its upwardly directed face with the membrane 26a in register with the peripheral portion 28d, the intermediate portion 28e, the periphery of the central portion 28c, and in the center of the cavity 28b. Facing the convex portion of the cavity 28b, the membrane 26 has a bulge 26b which bears against said convex portion. Via its opposite face that faces downwards, the part 28 forming a support for the membrane is in contact with the holding ring 36, thereby ensuring good contact between said part and the membrane 26. The part 28 forming a support for the membrane and the holding ring together form a stack, and the membrane 26 forms a kind of cap covering the part 28 and encompassing said stack by covering a peripheral portion of the downwardly directed face of the ring. The holding ring 36 serves to keep the valve member on the valve shaft 20.

When a fire breaks out and the temperature rises, the valve member 18 comes quickly into top abutment against the valve seat 12a. Given that the material from which the membrane is made begins to melt, it can no longer provide sealing. However, gastight sealing is provided by the continuous surface 28a of the metal part 28 which bears against the valve seat 12a via a portion of said surface, the remainder of said surface serving to close the opening 16. This sealing is reinforced by the frustoconical shape of the intermediate portion 28e. It should be observed that the use of a stepper type motor makes it possible, advantageously, for said motor to advance a few more steps after contact has been obtained between the leakproof continuous surface 28a and the valve seat 12a, thereby improving sealing.

Figure 2:
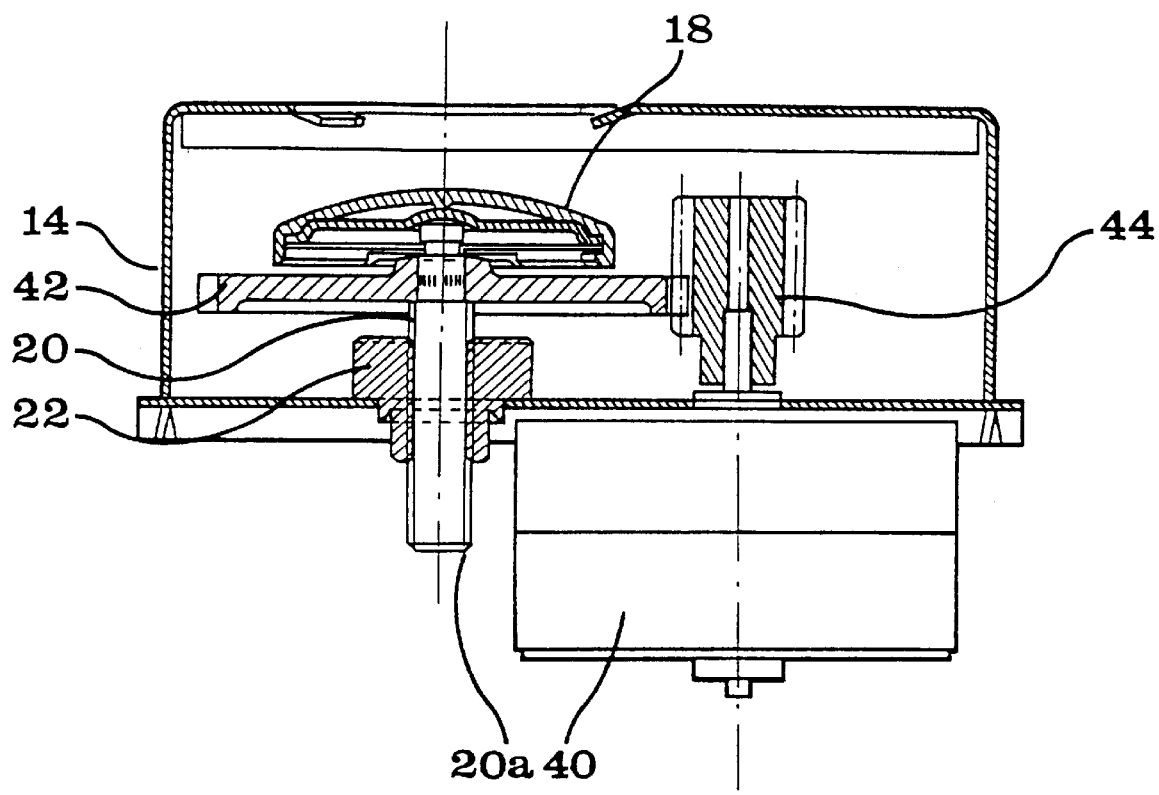
FIG. 2 is a diagrammatic section view through another embodiment of the interrupter of the invention.

FIG. 2 shows another embodiment in which a stepper motor 40 transmits rotary motion to the valve shaft 20 via a mechanical drive device. By way of example, this device is constituted by a driven gear wheel 42 engaged on the valve shaft 20 and co-operating with a driving gear wheel 44 connected to the motor 20, said drive motor rotating said driving gear wheel 44 about a second axis parallel to the axis of the valve shaft 20.

The driving gear wheel 44 shown in FIG. 2 extends parallel to the valve shaft in a "height" direction through a distance that corresponds to the axial displacement of the valve member, while the height of the driven gear wheel 42 is smaller for reasons of compactness. Nevertheless, in gas meters where sufficient space is available, it is possible for both the driving gear wheel and the driven gear wheel to be of substantially the same height or for only the driven gear wheel to be of a height that corresponds to the axial displacement of the valve member.

By way of example, the driving gear wheel 44 may have thirteen teeth and the driven gear wheel 42 may have fifty-five teeth. Both the driving and the driven gear wheels have spur toothing, but it would be equally possible to use helical toothing.

In this figure, the driven gear wheel 42 is disposed between the valve member 18 and the nut-forming part 22, thereby being as compact as possible. Nevertheless, it is possible to dispose the driven gear wheel 42 beneath the nut-forming part 22 close to the end of the valve shaft opposite from its end carrying the valve member 18.

Figure 3:
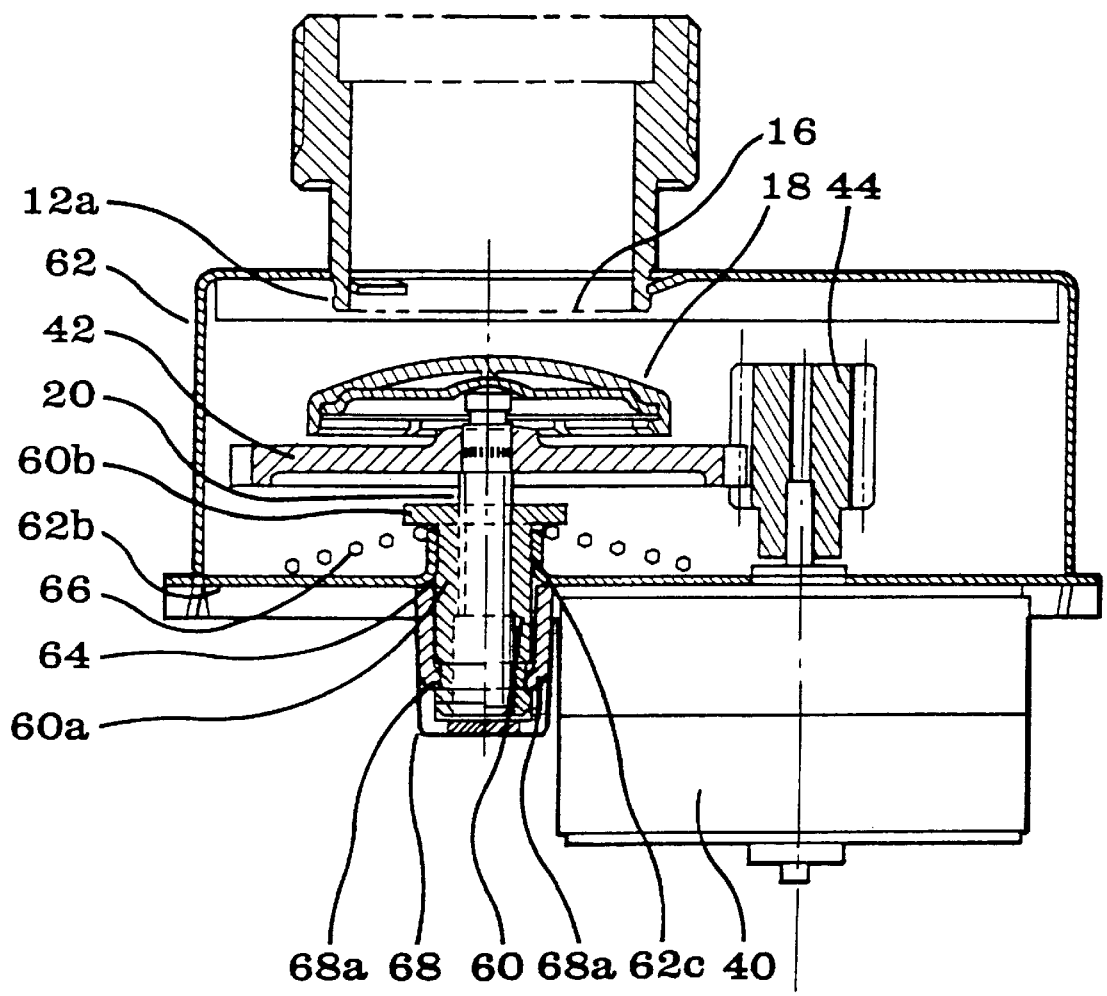
FIG. 3 is a diagrammatic section view through a variant of the first embodiment of the interrupter of the invention.

As shown in FIG. 3 (in which figure unchanged references are used for elements that are themselves unchanged), the nut-forming part 60 is constituted by a cylindrical sleeve 60a provided at its top end with a shoulder 60b. The metal frame 62 includes a base 62b through which an orifice 64 is formed that receives the cylindrical sleeve 60a of the nut-forming part. An annular rim 62c is provided at the periphery of the sleeve 60a to serve as an abutment for the shoulder 60b of the nut-forming part 60.

A resilient member such as a helical spring 66 is compressed between the base 62b and the shoulder 60b, thus exerting an upwardly directed force to the underside of the shoulder for the purpose of urging the valve member 18 into contact with its seat 12a.

The cylindrical sleeve 60a passes through the orifice 64 and projects beyond the other side of the base 62b. A "fuse" element 68 made of a material that melts under the action of heat is placed beneath the seat 62b to bear thereagainst and to exert a force on the nut-forming part which tends to oppose the compression force of the resilient member 66. The fuse element 68 made of hard plastics material may, for example, be in the general form of a beaker fitted over the portion of the sleeve 62a that projects from the base so as to have a rim bearing against said base and including a plurality of claws 68a projecting towards the inside of the beaker so as to engage in a neck 60c formed in the outside surface of the cylindrical sleeve 60a, thereby preventing the sleeve from moving upwards under drive from the spring 66.

When a fire breaks out upstream from the meter, the heat in the surroundings of the interrupter is transmitted to the fuse element 68 which melts. The claws 68a soften and can no longer oppose the force exerted by the spring 66 which presses hard against the shoulder 60b. Given that the nut-forming piece 60, the valve shaft 20, and the valve member 18 are secured to one another, the thrust force against the shoulder is transmitted to the valve shaft which rises and brings the valve member into contact with the valve seat 12a, thereby providing sealing.

It should nevertheless be observed that this system for closing the interrupter quickly in the event of a fire in the vicinity of the gas meter can be combined with any device for rotating the valve shaft by means of a motor, providing it allows the valve member and its shaft a degree of freedom in translation along the longitudinal displacement direction of the valve member.

Since the fuse element 68 is connected to the valve seat 12a via the metal frame 62, heat in the vicinity of the opening 16 is quickly transmitted by conduction through the metal of the frame, thereby accelerating melting of the fuse element.

It is possible to provide for the nut-forming part 22 (or 60) as shown in FIGS. 1a and 2 (or FIG. 3) to be replaced by a part that forms a smooth bearing which serves solely to guide the valve shaft in translation.

The device for imparting mechanical drive to the valve shaft 20 from the motor while leaving a degree of freedom to move in translation along the longitudinal displacement direction of the valve member 18, is not limited to that described above. By way of example, the device could be constituted by a smooth belt or by a cog belt mounted on the valve shaft and on the outlet shaft of the motor.

Figure 4:
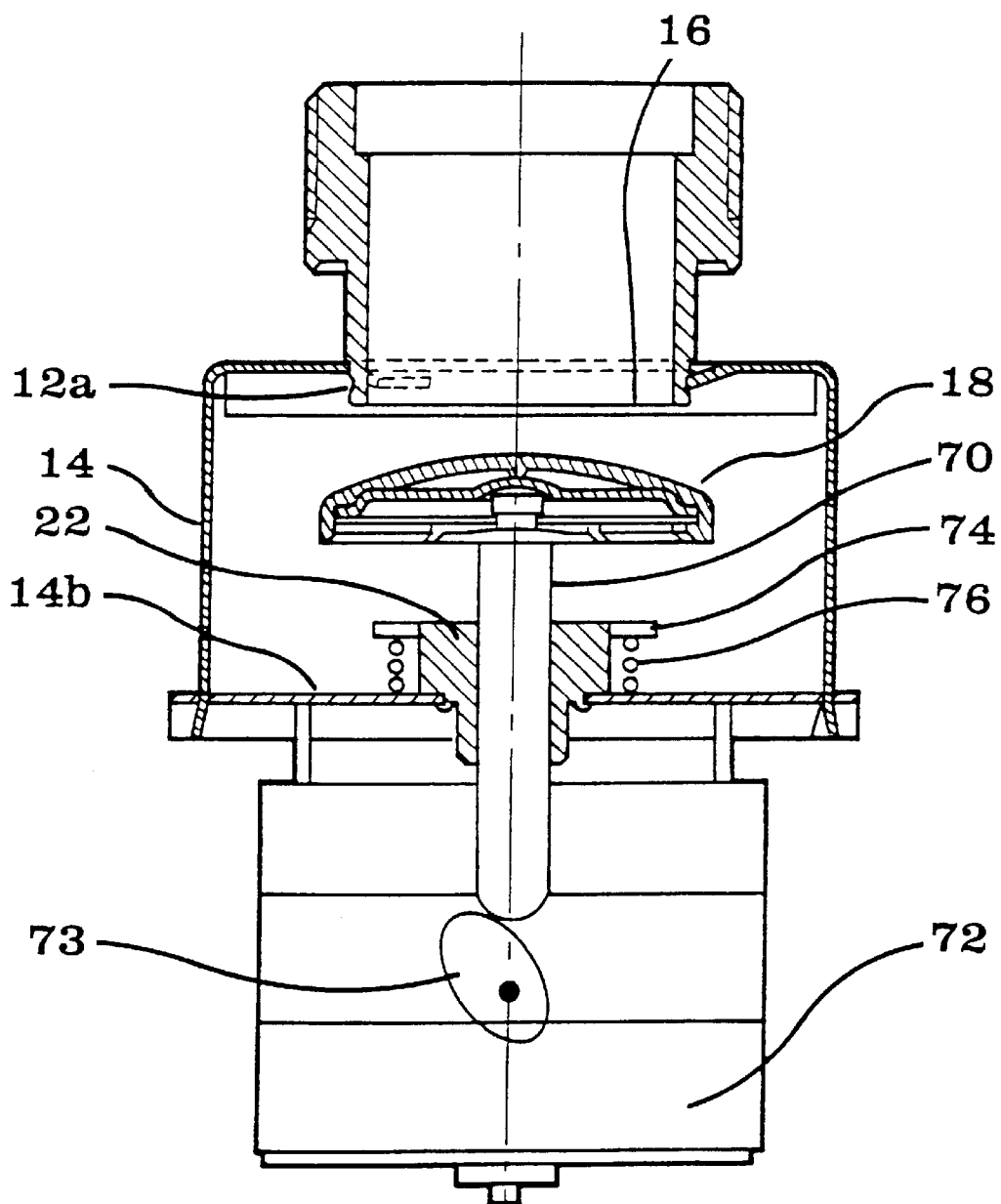
FIG. 4 is a diagrammatic section view through a variant of the second embodiment of the interrupter of the invention.

As shown in FIG. 4 (in which figure references of elements that are unchanged from FIG. 1 have been used again), the valve shaft 70 slides in a smooth bearing 22 mounted in the base 14b of the metal frame 14, e.g. by crimping. The valve shaft 70 is connected to the outlet shaft of the motor 72 (which shaft is perpendicular to the plane of FIG. 4) by means of a cam 73 against which the valve shaft rests under the effect of its own weight. The cam serves to transform the rotary motion of said motor outlet shaft into translation motion.

A fuse 74 made of a material that melts under the action of heat is disposed between the valve member 18 and a resilient member 76 in the form of a helical spring and bearing against a support that corresponds to the base 14b. The fuse element 74 is in direct contact with the spring 76 and holds it pressed against the base 14b. The fuse element is in the form of a collar 74 projecting from the periphery of the bearing 22, e.g. being secured thereto by adhesive. When the temperature around the interrupter reaches the melting temperature of the material from which the fuse element is made, the collar melts and the released spring comes into contact with the bottom portion of the valve member 18 and urges it upwards until it comes into contact with the valve seat 12a.

It should be observed, by way of example, that it is also possible to use the mechanical drive device shown in FIG. 3 with the resilient member and the fuse element shown in FIG. 4.

We claim:

1. A gas flow interrupter for a gas meter, the interrupter comprising a valve member that is movable relative to a valve seat which defines an opening for passing said gas flow, said valve member comprising firstly a membrane having a main surface including a "contact zone" portion that comes into contact with said valve seat when the interrupter is in its closed position, thereby closing said opening by means of the main surface of the valve member, and secondly a part that forms a mechanical support for the membrane and that co-operates with said membrane, wherein the part forming a support for the membrane has a continuous leakproof surface bounded by the contact zone, and possesses a frustoconical bearing surface situated facing the contact zone so as to close the opening in the event of the membrane failing to provide sealing.

2. An interrupter according to claim 1, in which the part forming a support for the membrane rests in equilibrium on a pivot and is thus placed between the membrane and said pivot.

3. An interrupter according to claim 2, in which the part forming a support for the membrane is centered on the pivot.

4. An interrupter according to claim 2, in which the pivot has an endpiece with a spherical bearing surface.

5. An interrupter according to claim 2, in which the part forming a support for the membrane has a cavity facing the pivot and in which said pivot is received.

6. An interrupter according to claim 5, in which a portion of the membrane in register with the cavity bears against the part forming a support for the membrane.

7. An interrupter according to claim 1, in which the part forming a support for the membrane is generally in the form of a disk.

8. An interrupter according to claim 1, in which the frustoconical bearing surface of the disk is disposed between a central portion and a peripheral portion which are both substantially plane.

9. An interrupter according to claim 2, in which the part forming a support for the membrane is in contact with the membrane via one of its faces, and via its opposite face it is in contact with a holding ring engaged around an element extending the pivot, said membrane forming a cap which covers the part forming a support for the membrane and which encompasses the stack constituted by said part and by said ring, covering a peripheral portion of the face of the ring which is not in contact with said part.

10. An interrupter according to claim 1, in which the valve member is connected to a valve shaft extending along a longitudinal direction and mounted to move in said direction under drive from a motor driving said valve shaft by means of a mechanical drive device which leaves the valve shaft with a degree of freedom to move in translation along said direction.

11. An interrupter according to claim 10, in which a compressed resilient member co-operates with a "fuse" element made of a material that melts under the action of heat so that below the melting temperature of said material the resilient member is held in a compressed state, and at around the melting temperature of the material, the resilient member is released and forces the valve member to come into contact with the valve seat.

12. An interrupter according to claim 11, in which a part tied to the valve shaft is subjected to the force of the resilient member urging the valve member towards the valve seat, and is held in position by means of the fuse element.

13. An interrupter according to claim 12, in which the valve shaft is threaded and the part tied to the valve shaft forms a nut in which said valve shaft is engaged, said nut-forming part is received in an orifice formed through a base and it includes a shoulder, the resilient member being compressed between said base and said shoulder so as to exert a force on said part that urges it towards the valve seat.

14. An interrupter according to claim 13, in which the nut-forming part passes through the orifice and projects beyond the base away from the side where the resilient member is located, the fuse element being held pressing against said base and exerting a force on said part holding it away from the valve seat.

15. An interrupter according to claim 11, in which the fuse element is placed between the valve member and the resilient member which bears against a support, said fuse element being in direct contact with said resilient member to hold it compressed against its support.

16. An interrupter according to claim 15, in which the valve shaft slides in a bearing mounted on the support, and the fuse element forms a collar disposed around said bearing, the resilient member being compressed between said collar and said support.

17. A gas meter fitted with a gas flow interrupter, comprising a valve member that is movable relative to a valve seat which defines an opening for passing said gas flow, said valve member comprising firstly a membrane having a main surface including a "contact zone" portion that comes into contact with said valve seat when the interrupter is in its closed position, thereby closing said opening by means of the main surface of the valve member, and secondly a part that forms a mechanical support for the membrane and that co-operates with said membrane, wherein the part forming a support for the membrane has a continuous leakproof surface bounded by the contact zone, and possesses a frustoconical bearing surface situated facing the contact zone so as to close the opening in the event of the membrane failing to provide sealing.

* * * * *